United States Patent
Lyu et al.

(10) Patent No.: US 12,192,979 B2
(45) Date of Patent: Jan. 7, 2025

(54) METHOD FOR NODE USED FOR WIRELESS COMMUNICATION AND APPARATUS

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/617,541

(22) Filed: Mar. 26, 2024

(65) Prior Publication Data

US 2024/0323941 A1   Sep. 26, 2024

Related U.S. Application Data

(63) Continuation of application No. PCT/CN2023/083611, filed on Mar. 24, 2023.

(51) Int. Cl.
*H04B 7/14*   (2006.01)
*H04W 72/044*   (2023.01)
(Continued)

(52) U.S. Cl.
CPC ..... *H04W 72/046* (2013.01); *H04W 72/0446* (2013.01); *H04W 16/26* (2013.01)

(58) Field of Classification Search
CPC ................. H04W 72/046; H04W 72/0446
(Continued)

(56) References Cited

U.S. PATENT DOCUMENTS

2020/0280355 A1   9/2020   Abedini et al.
2022/0053433 A1   2/2022   Abedini et al.
(Continued)

FOREIGN PATENT DOCUMENTS

| CN | 115225131 | 10/2022 |
|---|---|---|
| CN | 115720366 | 2/2023 |
| WO | WO 2022218229 | 10/2022 |

OTHER PUBLICATIONS

3GPP TR 38.867 V18.0.0, "3rd Generation Partnership Project; Technical Specification Group Radio Access network; Study on NR network-controlled repeaters; (Release 18)," Sep. 2022, 21 pages.
(Continued)

*Primary Examiner* — Temica M Beamer
(74) *Attorney, Agent, or Firm* — Fish & Richardson P.C.

(57) ABSTRACT

A method for a node used for wireless communication and an apparatus are provided. A first node receives a plurality of pieces of beam information and a plurality of time resource sets. The plurality of time resource sets are associated with the plurality of pieces of beam information respectively. At least two of the plurality of time resource sets each comprises a first time resource. At least two pieces of beam information respectively associated with the at least two time resource sets are different. At least one of the at least two pieces of beam information is used to determine that a NCR-Fwd is in a first state on a first time resource, the first state is one of a plurality of candidate states including at least two of a stopping state, applying one or more first-type beams for transmissions, or applying one or more first-type beams for receptions.

20 Claims, 5 Drawing Sheets

(51) Int. Cl.
H04W 72/0446 (2023.01)
H04W 16/26 (2009.01)

(58) Field of Classification Search
USPC .......................................................... 370/315
See application file for complete search history.

(56) References Cited

U.S. PATENT DOCUMENTS

| | | | | |
|---|---|---|---|---|
| 2023/0283358 | A1* | 9/2023 | Rudolf | .............. H04B 7/15528 |
| | | | | 370/315 |
| 2024/0187085 | A1* | 6/2024 | McMenamy | ...... H04B 7/15507 |

OTHER PUBLICATIONS

Fujitsu, "Discussion on side control information and NCR behavior," 3GPP TSG RAN WG1 #112, RI-2300754, Athens, Greece, Feb. 27-Mar. 3, 2023, 25 pages.

Huawei et al., "Side control information and behaviors for network-controlled repeaters," 3GPP TSG-RAN WG1 Meeting #112, R1-2300121, Athens, Greece, Feb. 27-Mar. 3, 2023, 14 pages.

International Search Report and Written Opinion in International Appln. No. PCT/CN2023/083611, mailed on Dec. 8, 2023, 14 pages (with English machine translation).

Zte et al., "New WID on NR network-controlled repeaters," 3GPP TSG RAN Meeting #97-e, RP-222673, Electronic Meeting, Sep. 12-16, 2022, 5 pages.

LG Electronics, "Discussion on side control information and NCR behaviour," 3GPP TSG RAN WG1 #112, R1-2301070, Athens, Greece, Feb. 27-Mar. 3, 2023, 5 pages.

Office Action in Chinese Appln. No. 202380009525.9, mailed on Apr. 7, 2024, 30 pages (with English machine translation).

Office Action in Chinese Appln. No. 202380009525.9, mailed on Aug. 15, 2024, 28 pages (with English machine translation).

Sony, "More considerations on side control information and NCR behavior," 3GPP TSG RAN WG1#112, R1-2300885, Athens (GR), Feb. 27-Mar. 3, 2023, 9 pages.

VIVO, "Discussion on side control information and NCR behavior," 3GPP TSG RAN WG1 #112, R1-2300467, Athens, Greece, Feb. 27-Mar. 3, 2023, 25 pages.

* cited by examiner

METHOD FOR NODE USED FOR WIRELESS COMMUNICATION AND APPARATUS

CROSS-REFERENCE TO RELATED APPLICATIONS

This application is a continuation of International Application No. PCT/CN2023/083611, filed on Mar. 24, 2023, the disclosure of which is hereby incorporated by reference in its entirety.

TECHNICAL FIELD

The present application relates to the field of communications technologies, and more specifically, to a method for a node used for wireless communication and an apparatus.

BACKGROUND

Some new network nodes are gradually proposed to improve a coverage capability of a network and to support a user quantity growing at a high speed. Such new network nodes may improve network deployment flexibility, and thus receive increasing attention. For example, a relay node that may amplify and forward a radio signal between a user equipment (UE) and a base station is introduced in some communications systems. The relay node may be, for example, a network-controlled repeater (NCR).

In a scenario in which the relay node is deployed, to improve spatial directivity of forwarding by the relay node, the base station may perform a beam indication to the relay node. When the base station performs a beam indication to the relay node by indicating a combination of beam information and a time resource set, due to a load limitation of indication signaling, some time resources may correspond to a plurality of pieces of different beam information, thereby causing beam indication conflict, and causing operation confusion of the relay node, or increasing power consumption of the relay node, or increasing signaling overheads, or increasing a transfer delay, or reducing beam indication accuracy, or deteriorating system transmission quality.

SUMMARY

Embodiments of the present application provide a method for a node used for wireless communication and an apparatus. Various aspects used in the present application are described below.

According to a first aspect, a first node used for wireless communication is provided. The first node includes a first module and a second module. The first module receives first information, where the first information includes a plurality of pieces of beam information and a plurality of time resource sets, and the plurality of time resource sets are associated with the plurality of pieces of beam information respectively. At least two of the plurality of time resource sets include a first time resource, and at least two pieces of beam information respectively associated with the at least two time resource sets are different. At least one of the at least two pieces of beam information is used to determine that the second module is in a first state on the first time resource, the first state is one of a plurality of candidate states, and the plurality of candidate states include at least two of an off state, applying one or more first-type beams for transmissions of a radio signal, and applying one or more first-type beams for receptions of a radio signal.

In an implementation, the first time resource includes one or more multicarrier symbols.

In an implementation, the first information includes downlink control information (DCI), or the first information includes a DCI format 5_0.

In an implementation, the first module receives second information, where the second information is used to indicate one or more time resource lists, and each of the one or more time resource lists includes a plurality of time resource sets; and each the plurality of time resource sets included in the first information is one of the plurality of time resource sets included in one of the one or more time resource lists indicated by the second information.

In an implementation, one of the at least two pieces of beam information is first beam information, and the first beam information is used to determine that the first state is the off state.

In an implementation, at least one of the at least two pieces of beam information is used to determine the one or more first-type beams.

In an implementation, respective positions of the at least two pieces of beam information in the plurality of pieces of beam information included in the first information are used to determine second beam information, and the second beam information is used to determine the one or more first-type beams.

In an implementation, the second beam information is one of the at least two pieces of beam information in the first information, before any other piece of beam information of the at least two pieces of beam information.

In an implementation, the at least two pieces of beam information are all used to determine the plurality of first-type beams.

In an implementation, the plurality of pieces of beam information included in the first information are carried in a same piece of signaling, or the plurality of pieces of beam information included in the first information are carried in different pieces of signaling.

According to a second aspect, a second node used for wireless communication is provided, including: a first transmitter, configured to send first information, where the first information includes a plurality of pieces of beam information and a plurality of time resource sets, and the plurality of time resource sets are associated with the plurality of pieces of beam information respectively. At least two of the plurality of time resource sets include a first time resource, and at least two pieces of beam information respectively corresponding to the at least two time resource sets are different. At least one of the at least two pieces of beam information is used to determine that the second module of a first node is in a first state on the first time resource, the first state is one of a plurality of candidate states, and the plurality of candidate states include at least two of an off state, sending a radio signal by using one or more first-type beams, and receiving a radio signal by using one or more first-type beams.

In an implementation, the first time resource includes one or more multicarrier symbols.

In an implementation, the first information includes DCI, or the first information includes a DCI format 5_0.

In an implementation, the first transmitter sends second information, where the second information is used to indicate one or more time resource lists, and each of the one or more time resource lists includes a plurality of time resource sets; and each of the plurality of time resource sets included in the first information is one of the plurality of time resource sets included in one of the one or more time resource lists indicated by the second information.

In an implementation, one of the at least two pieces of beam information is first beam information, and the first beam information is used to determine that the first state is the off state.

In an implementation, at least one of the at least two pieces of beam information is used to determine the one or more first-type beams.

In an implementation, respective positions of the at least two pieces of beam information in the plurality of pieces of beam information included in the first information are used to determine second beam information, and the second beam information is used to determine the one or more first-type beams.

In an implementation, the second beam information is one of the at least two pieces of beam information in the first information, before any other piece of beam information of the at least two pieces of beam information.

In an implementation, the at least two pieces of beam information are all used to determine the plurality of first-type beams.

In an implementation, the plurality of pieces of beam information included in the first information are carried in a same piece of signaling, or the plurality of pieces of beam information included in the first information are carried in different pieces of signaling.

According to a third aspect, a method for a first node used for wireless communication is provided. The first node includes a first module and a second module. The method includes: receiving first information, where the first information includes a plurality of pieces of beam information and a plurality of time resource sets, and the plurality of time resource sets are associated with the plurality of pieces of beam information respectively. At least two of the plurality of time resource sets include a first time resource, and at least two pieces of beam information respectively associated with the at least two time resource sets are different. At least one of the at least two pieces of beam information is used to determine that the second module is in a first state on the first time resource, the first state is one of a plurality of candidate states, and the plurality of candidate states include at least two of an off state, applying one or more first-type beams for transmissions of a radio signal, and applying one or more first-type beams for receptions of a radio signal.

In an implementation, the first time resource includes one or more multicarrier symbols.

In an implementation, the first information includes DCI, or the first information includes a DCI format 5_0.

In an implementation, the method further includes: receiving second information, where the second information is used to indicate one or more time resource lists, and each of the one or more time resource lists includes a plurality of time resource sets; and each of the plurality of time resource sets included in the first information is one of the plurality of time resource sets included in one of the one or more time resource lists indicated by the second information.

In an implementation, one of the at least two pieces of beam information is first beam information, and the first beam information is used to determine that the first state is the off state.

In an implementation, at least one of the at least two pieces of beam information is used to determine the one or more first-type beams.

In an implementation, respective positions of the at least two pieces of beam information in the plurality of pieces of beam information included in the first information are used to determine second beam information, and the second beam information is used to determine the one or more first-type beams.

In an implementation, the second beam information is one of the at least two pieces of beam information in the first information, before any other piece of beam information of the at least two pieces of beam information.

In an implementation, the at least two pieces of beam information are all used to determine the plurality of first-type beams.

In an implementation, the plurality of pieces of beam information included in the first information are carried in a same piece of signaling, or the plurality of pieces of beam information included in the first information are carried in different pieces of signaling.

According to a fourth aspect, a method for a second node used for wireless communication is provided, including: sending first information, where the first information includes a plurality of pieces of beam information and a plurality of time resource sets, and the plurality of time resource sets are associated with the plurality of pieces of beam information respectively. At least two of the plurality of time resource sets include a first time resource, and at least two pieces of beam information respectively corresponding to the at least two time resource sets are different. At least one of the at least two pieces of beam information is used to determine that the second module of a first node is in a first state on the first time resource, the first state is one of a plurality of candidate states, and the plurality of candidate states include at least two of an off state, sending a radio signal by using one or more first-type beams, and receiving a radio signal by using one or more first-type beams.

In an implementation, the first time resource includes one or more multicarrier symbols.

In an implementation, the first information includes DCI, or the first information includes a DCI format 5_0.

In an implementation, the method further includes: sending second information, where the second information is used to indicate one or more time resource lists, and each of the one or more time resource lists includes a plurality of time resource sets; and each of the plurality of time resource sets included in the first information is one of the plurality of time resource sets included in one of the one or more time resource lists indicated by the second information.

In an implementation, one of the at least two pieces of beam information is first beam information, and the first beam information is used to determine that the first state is the off state.

In an implementation, at least one of the at least two pieces of beam information is used to determine the one or more first-type beams.

In an implementation, respective positions of the at least two pieces of beam information in the plurality of pieces of beam information included in the first information are used to determine second beam information, and the second beam information is used to determine the one or more first-type beams.

In an implementation, the second beam information is one of the at least two pieces of beam information in the first information, before any other piece of beam information of the at least two pieces of beam information.

In an implementation, the at least two pieces of beam information are all used to determine the plurality of first-type beams.

In an implementation, the plurality of pieces of beam information included in the first information are carried in a same piece of signaling, or the plurality of pieces of beam information included in the first information are carried in different pieces of signaling.

According to a fifth aspect, a first node used for wireless communication is provided, including a transceiver, a memory, and a processor, where the memory is configured to store a program, and the processor is configured to: invoke the program in the memory, and control the transceiver to receive or send a signal, so that the first node performs the method in any implementation of the first aspect.

According to a sixth aspect, a second node used for wireless communication is provided, including a transceiver, a memory, and a processor, where the memory is configured to store a program, and the processor is configured to: invoke the program in the memory, and control the transceiver to receive or send a signal, so that the node performs the method in any implementation of the second aspect.

According to a seventh aspect, an embodiment of the present application provides a communications system, where the system includes the first node and/or the second node described above. In another possible design, the system may further include another device interacting with the first node or the second node in the solution provided in the embodiments of the present application.

According to an eighth aspect, an embodiment of the present application provides a computer-readable storage medium. The computer-readable storage medium stores a computer program, and the computer program enables a computer to perform some or all of the steps in the method according to the foregoing aspects.

According to a ninth aspect, an embodiment of the present application provides a computer program product. The computer program product includes a non-transitory computer-readable storage medium storing a computer program, and the computer program is operable to enable a computer to perform some or all of the steps of the method according to the foregoing aspects. In some implementations, the computer program product may be a software installation package.

According to a tenth aspect, an embodiment of the present application provides a chip. The chip includes a memory and a processor, and the processor may invoke and run a computer program from the memory, to implement some or all of the steps of the method according to the foregoing aspects.

In the embodiment of the present application, when the at least two pieces of beam information corresponding to the first time resource are different, the first node as a relay can determine, based on at least one of the at least two pieces of beam information, that the second module of the first node is in the off state, or determine the first-type beam used to send or receive a radio signal, so that a problem of beam indication conflict can be resolved.

The method for a node used for wireless communication and the apparatus that are provided in the embodiments of the present application help reduce power consumption of a relay node.

The method for a node used for wireless communication and the apparatus that are provided in the embodiments of the present application help reduce signaling overheads.

The method for a node used for wireless communication and the apparatus that are provided in the embodiments of the present application help reduce a transfer delay.

The method for a node used for wireless communication and the apparatus that are provided in the embodiments of the present application help improve beam indication accuracy.

The method for a node used for wireless communication and the apparatus that are provided in the embodiments of the present application help improve system transmission quality.

DETAILED DESCRIPTION OF THE EMBODIMENTS

Architecture of a Communications System

Figure 1:
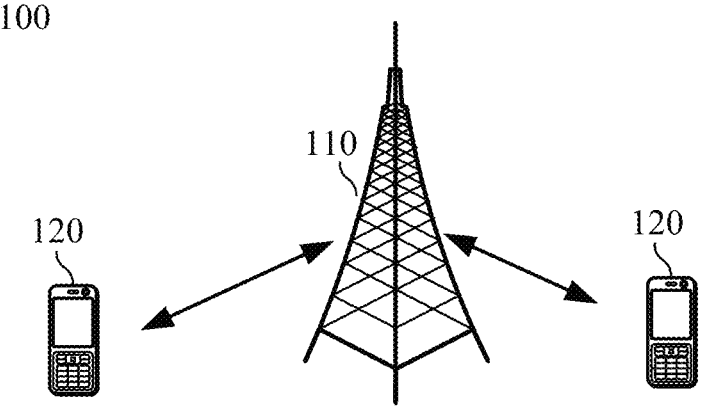
FIG. 1 is an example diagram of a system architecture of a wireless communications system to which an embodiment of the present application is applicable.

FIG. 1 is an example diagram of a system architecture of a wireless communications system 100 to which an embodiment of the present application is applicable. The wireless communications system 100 may include a network device 110 and a user equipment 120. The network device 110 may be a device in communication with the user equipment 120. The network device 110 may provide communication coverage for a specific geographic area, and may communicate with the user equipment 120 located within the coverage.

FIG. 1 exemplarily shows one network device and two user equipments. Optionally, the wireless communications system 100 may include a plurality of network devices, and another quantity of user equipments may be included in coverage of each network device, which is not limited in the embodiments of the present application.

Optionally, the wireless communications system 100 may further include other network entities such as a network controller and a mobility management entity, which is not limited in the embodiments of the present application.

It should be understood that technical solutions of the embodiments of the present application may be applied to various communications systems, such as a 5th generation (5G) system or a new radio (NR) system, a long term evolution (LTE) system, an LTE frequency division duplex (FDD) system, and LTE time division duplex (TDD) system. The technical solutions provided in the present application may further be applied to a future communications system, such as a 6th generation mobile communications system or a satellite communications system.

The user equipment in the embodiments of the present application may alternatively be referred to as a terminal device, an access terminal, a subscriber unit, a subscriber station, a mobile, a mobile station (MS), a mobile terminal (MT), a remote station, a remote terminal, a mobile device, a user terminal, a terminal, a wireless communications device, a user agent, or a user apparatus. The user equipment in the embodiments of the present application may be a device providing a user with voice and/or data connectivity and may be used to connect people, objects, and machines, such as a handheld device or vehicle-mounted device having a wireless connection function. The user equipment in the embodiments of the present application may be a mobile phone, a tablet computer (pad), a notebook computer, a palmtop computer, a mobile Internet device (MID), a wearable device, a virtual reality (VR) vehicle, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. Optionally, the UE may be used to act as a base station. For example, the UE may act as a scheduling entity, and provides a sidelink signal between UEs in V2X, D2D, or the like. For example, a cellular phone and a vehicle communicate with each other by using a sidelink signal. A cellular phone and a smart home device communicate with each other, without relaying a communication signal by using a base station.

The network device in the embodiments of the present application may be a device for communicating with the user equipment. The network device may also be referred to as an access network device or a wireless access network device. For example, the network device may be a base station. The network device in the embodiments of the present application may be a radio access network (RAN) node (or device) that connects the user equipment to a wireless network. The base station may broadly cover the following various names, or may be replaced with the following names, such as a NodeB, an evolved NodeB (eNB), a next generation NodeB (gNB), a relay station, an access point, a transmitting and receiving point (TRP), a transmitting point (TP), a master eNode MeNB, a secondary eNode SeNB, a multi-standard radio (MSR) node, a home base station, a network controller, an access node, a radio node, an access point (AP), a transmission node, a transceiver node, a baseband unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in device to device D2D, vehicle-to-everything (V2X), and machine-to-machine (M2M) communications, a network-side device in a 6G network, a device that functions as a base station in a future communications system, or the like. The base station may support networks with a same access technology or different access technologies. A specific technology and a specific device form used by the network device are not limited in the embodiments of the present application.

The base station may be fixed or mobile. For example, a helicopter or an unmanned aerial vehicle may be configured to act as a mobile base station, and one or more cells may move according to a position of the mobile base station. In another example, a helicopter or an unmanned aerial vehicle may be configured to serve as a device in communication with another base station.

In some deployments, the network device in the embodiments of the present application may be a CU or a DU, or the network device includes a CU and a DU. The gNB may further include an AAU.

The network device and the user equipment may be deployed on land, including being indoors or outdoors, handheld, or in-vehicle, may be deployed on a water surface, or may be deployed on a plane, a balloon, or a satellite in the air. A scenario in which the network device and the user equipment are located is not limited in the embodiments of the present application.

It should be understood that all or some of functions of the communications device in the present application may also be implemented by software functions running on hardware, or by virtualization functions instantiated on a platform (for example, a cloud platform).

New Network Node in a Communications System

In a trend of network densification and a millimeter wave (mmW) communication application, some new network nodes are gradually proposed to improve a coverage capability of a network and to support a user quantity growing at a high speed. Such new network nodes may improve network deployment flexibility, and thus receive increasing attention.

For example, an integrated access and backhaul (IAB) node is introduced in an NR Release-16 (Rel-16) version. The IAB node is further enhanced in an NR Release-17 (Rel-17) version. A major feature of the IAB node is that no wired backhaul link needs to be disposed between network nodes.

For another example, a wireless repeater widely used in 2G, 3G, and 4G systems also belongs to a relatively new network node other than a base station. The wireless repeater may also be referred to as a radio frequency repeater (RF repeater) or a relay. A conventional wireless repeater is simply used to amplify and forward a received signal. Although such a type of wireless repeater has a simple function and high cost-effectiveness, a flexible adjustment can be performed based on an actual condition of the communications system, and therefore, performance is poor. An NCR is introduced in some communications systems compared to the conventional wireless repeater. A capability to receive and process side control information (SCI) from the network device is added to the NCR. Based on the SCI, the NCR can efficiently perform signal amplification and forwarding functions, and reduce unnecessary noise amplification, thereby providing better spatial directivity of reception and sending of the NCR, and simplifying network integration. The NR Release-18 (Rel-18) version carries out a study item (SI) of the NCR. In September 2022, the 3GPP passed RP-222673 and started an "NR NCR" work item (WI) in the NR Rel-18, thereby formalizing standardization of the NCR in the NR system.

Figure 2:
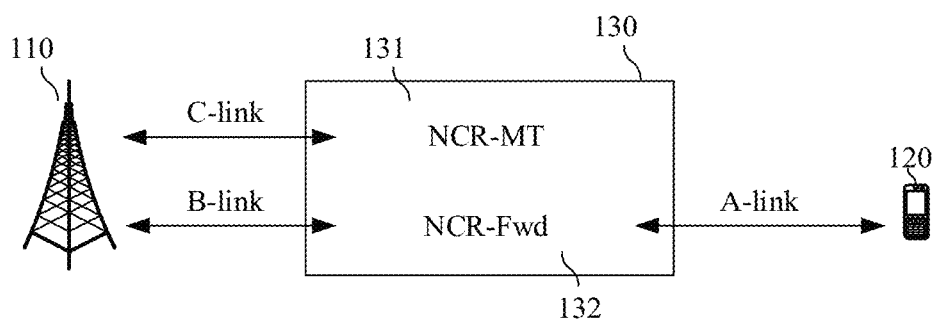
FIG. 2 is a schematic structural diagram of an NCR.

According to the study report (3GPP TR38.867) of the NCR, as shown in FIG. 2, an NCR 130 mainly includes two functional modules: an NCR-mobile termination (NCR-MT) 131 and an NCR-forwarding (NCR-Fwd) 132. The NCR-MT 131 may be responsible for exchanging the SCI with a base station 110 through a control link (C-link). The NCR-forwarding (NCR-Fwd) 132 is mainly responsible for amplifying and forwarding uplink (UL)/downlink (DL) radio frequency signals between the base station 110 and the user equipment 120 through a backhaul link (B-link) and an access link (A-link). Behavior of the NCR-Fwd 132 is controlled by SCI from the base station 110. The SCI may include one or more of the following information: beam information, timing information, uplink-downlink time division duplex configuration (UL-DL TDD configuration) information, on-off information of the NCR-Fwd, and power control information of the NCR-Fwd.

In a scenario in which the relay node is deployed, to improve spatial directivity of forwarding by the relay node, the base station may perform a beam indication to the relay node. In an implementation, the base station may perform a beam indication by using the SCI.

Figure 3:
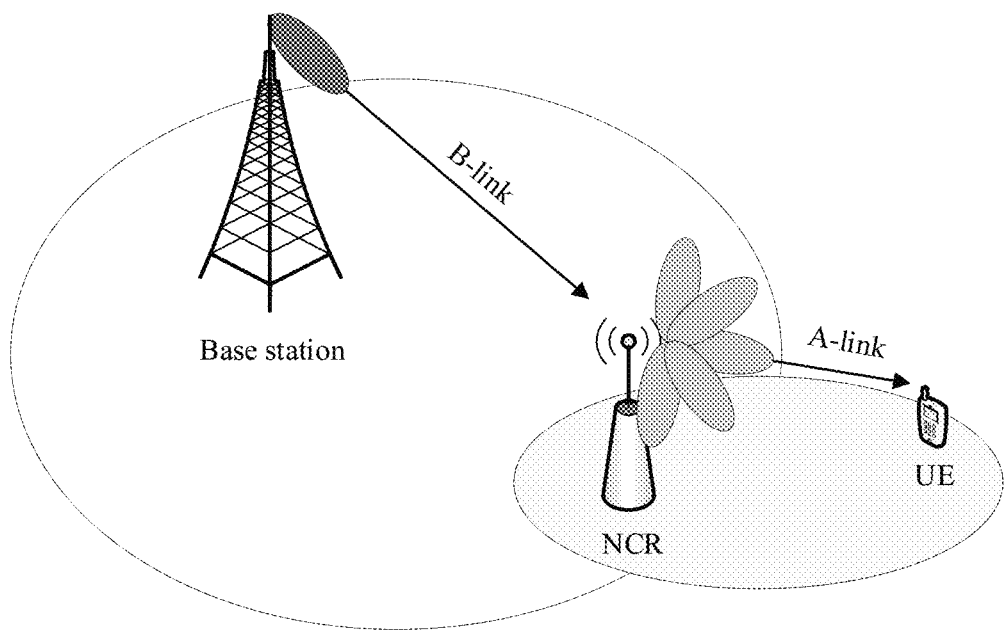
FIG. 3 is an example diagram of performing signal transmission based on a beam indication in an NCR scenario.

As shown in FIG. 3, a scenario in which an NCR is deployed is used as an example. For an access link, especially a high frequency band (for example, a frequency band FR2), the base station may perform a beam indication by using the SCI, to improve spatial directivity of forwarding by the NCR. In addition, performing a beam indication to the NCR by the base station further helps suppress interference and improve signal transmission reliability.

As described above, in the scenario in which the NCR is deployed, switch information that is of the NCR-Fwd and that is indicated by the base station by using the SCI may be used to control forwarding behavior of the NCR-Fwd. In some embodiments, if the base station does not directly or indirectly indicate that the NCR-Fwd is "on", the NCR-Fwd always remains in an "off" state. The NCR-Fwd remains in the "off" state by default, which helps reduce power overheads of the NCR and also helps reduce unnecessary interference.

In some embodiments, the base station performs a beam indication to the relay node (for example, the NCR) to increase spatial directivity of forwarding by the relay node or to indicate that the relay node is "on". According to a latest progress of NR Rel-18 standardization, the access link supports a periodic beam indication and an aperiodic beam indication. The periodic beam indication supports configuring several forwarding resources, a periodic beam indication period, and a reference subcarrier spacing (SCS) by using radio resource control (RRC) signaling. Each forwarding resource includes a beam index and a time resource. The aperiodic beam indication indicates a beam index and a time resource by using DCI. For a frequency band FR1 and a frequency band FR2, an "on" state of the relay node is also indicated through a beam indication. In some embodiments, even if the relay node has only one beam, the beam indication sent by the base station to the relay node is also used to indicate the "on" state of the relay node.

In some embodiments, the base station performs a beam indication to the relay node (for example, the NCR) to indicate the relay node to be "off". Although the relay node is in the "off" state by default, there is generally no need to specifically indicate the relay node to return from the "on" state to the "off" state. However, when the base station indicates, by using a periodic beam, the access link to perform semi-static or semi-persistent transmission, due to some special circumstances, such as avoiding a high-priority burst service, the relay node needs to temporarily return from the "on" state to the "off" state, and thus needs to be indicated by using dynamic signaling (for example, the DCI) to return to the "off" state. In an implementation, many companies propose to indicate, by indicating a specific beam index (for example, a "beam 0") and a specific time resource, that the relay node is in the "off" state on some time resources, to keep consistent with a manner of indicating that the relay node is in the "on" state.

It can be seen that in many cases, the base station needs to perform a beam indication to the relay node. For example, the base station may perform a beam indication to the relay node in the following two manners.

Figure 4:
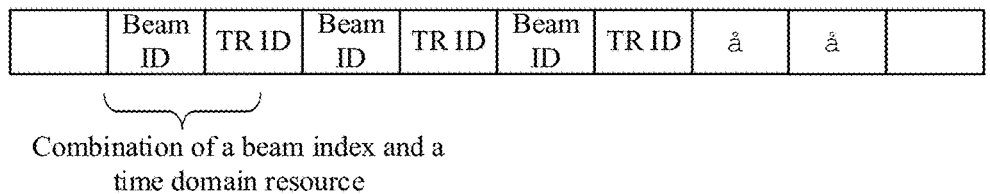
FIG. 4 is a possible implementation of a beam indication.

Manner 1: The base station may simultaneously indicate a plurality of combinations of a beam index and a time resource (TR) by using dynamic signaling (for example, DCI). FIG. 4 shows an example of indicating a plurality of combinations of a beam index and a time resource. However, if the manner 1 is used, the following two problems are caused.

It is agreed in a (RAN1 #111)$^{th}$ meeting that each time resource includes a starting slot (that is, a slot offset within one period), a starting symbol (that is, a symbol offset in a slot), and duration (duration, that is, a quantity of symbols), as shown in Table 1. In this case, relatively large signaling overheads in a time resource indication field are caused in the manner 1. Due to a load limitation of the dynamic signaling, a combination that is of a beam index and a time resource and that can be indicated by the dynamic signaling is limited.

TABLE 1

| Time resource | Slot offset | Symbol offset | Duration |
| --- | --- | --- | --- |
| TR 0 | 1 | 2 | 3 |
| TR 1 | 1 | 5 | 2 |
| TR 2 | 2 | 1 | 13 |
| . . . | | | |

Figure 5:
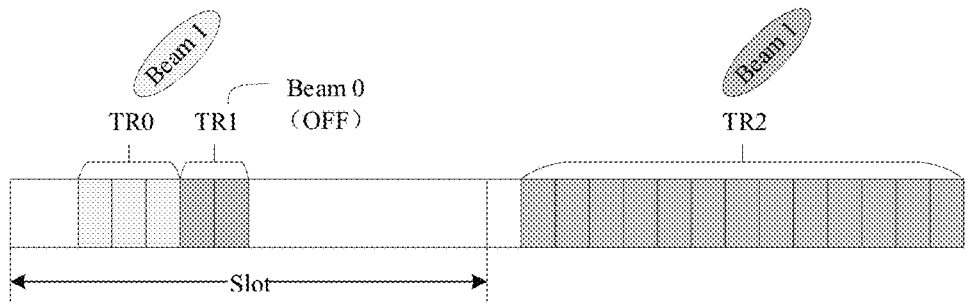
FIG. 5 is an example diagram in which a plurality of time resources correspond to a same beam index.

In addition, when a plurality of time resources use a same beam, as shown in FIG. 5, a same beam index (for example, a "beam 1") associated with the plurality of time resources needs to occupy a plurality of domains in one piece of signaling, thereby resulting in relatively low signaling utilization efficiency.

Figure 6:
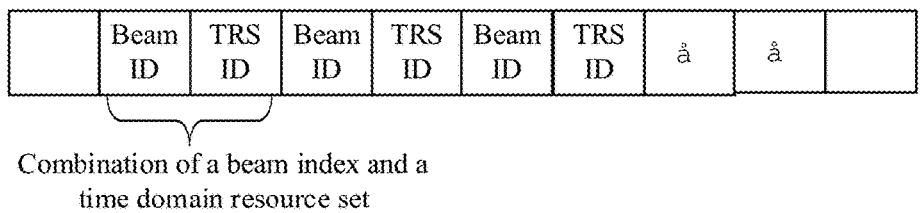
FIG. 6 is another possible implementation of a beam indication.

Manner 2: The base station may configure a plurality of time resource sets (TRS) by using higher layer signaling (for example, RRC signaling). The configured time resource sets are shown in Table 2. Then, the base station may indicate a plurality of combinations between a beam index and a time resource set by using dynamic signaling (for example, DCI), as shown in FIG. 6. A beam index on a plurality of time resource sets can be effectively indicated in the manner 2, thereby reducing signaling overheads, and reducing a processing delay caused by a plurality of pieces of signaling.

TABLE 2

| Time resource set ID | Time resource |
| --- | --- |
| TRS 0 | TR 0, TR 1, and TR 2 |
| TRS 1 | TR 2 and TR 3 |
| TRS 2 | TR 0, TR 1, and TR 3 |
| ... | |

However, when the manner 2 is used, due to a limitation of a signaling load, all time resource sets cannot be traversed, and some time resources in a plurality of time resource sets overlap, resulting in that the time resources may correspond to a plurality of beam indexes, thereby causing beam indication conflict, and causing operation confusion of the relay node, or increasing power consumption of the relay node, or increasing signaling overheads, or increasing a transfer delay, or reducing beam indication accuracy, or deteriorating system transmission quality. An example is provided below with reference to FIG. 7.

Figure 7:
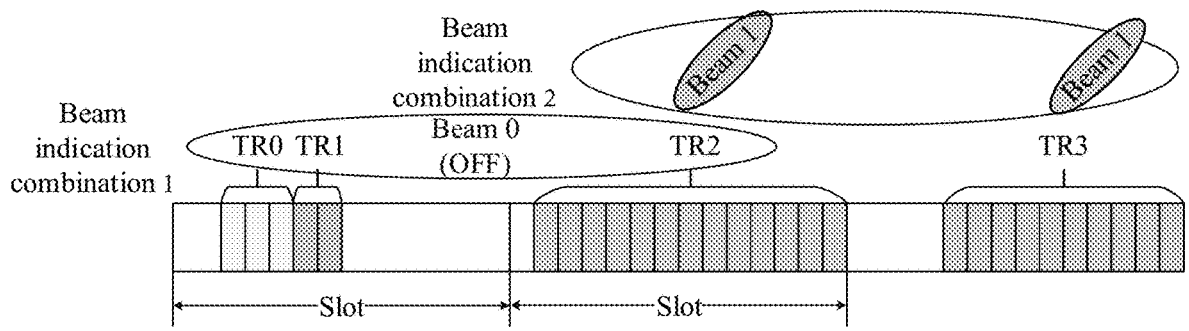
FIG. 7 is an example diagram in which time resources correspond to a plurality of beam indexes.

As shown in FIG. 7, a beam 0 corresponds to an "off" state. When dynamic signaling includes a beam indication combination 1 {beam 0, TRS 0} and a beam indication combination 2 {beam 1, TRS 1}, the TRS 0 includes a time resource TR 2, and the TRS 1 also includes the TR 2. Consequently, on the time resource TR 2, the relay node does not know whether to perform an "off" operation or to perform transmission by using the beam 1.

For the foregoing problem, a node with a relay function provided in this embodiment of the present application can determine, based on at least one of at least two pieces of beam information that conflicts on a first time resource, that a second module of a first node is in the "off" state, or determine a first-type beam used to send or receive a radio signal, so that one or more of the following objectives can be achieved: resolving a problem of beam indication conflict, reducing power consumption of the relay node, reducing signaling overheads, reducing a transfer delay, improving beam indication accuracy, and improving system transmission quality.

The method and apparatus that are provided in the present application are described below by using a plurality of embodiments or examples. It should be understood that, in a case of no conflict, embodiments for the first node of the present application and features in the embodiments may be applied to a second node, and vice versa. In a case of no conflict, the embodiments of the present application and the features in the embodiments may be arbitrarily combined with each other.

Figure 8:
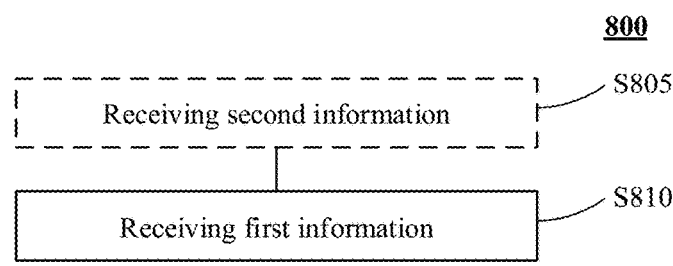
FIG. 8 is a schematic flowchart of a method for a first node used for wireless communication according to an embodiment of the present application.

FIG. 8 shows a method 800 for a first node used for wireless communication according to an embodiment of the present application. The first node may be any type of node having a relay function in a communications system.

In an embodiment, the first node may be an NCR.

In an embodiment, the first node device may be a wireless repeater.

In an embodiment, the first node may be a relay.

In an embodiment, the first node may be a user equipment, and the user equipment may serve as a relay node.

In an embodiment, the first node supports single-beam transmission.

In an embodiment, the first node supports only single-beam transmission.

In an embodiment, the first node includes only one radio frequency link.

In an embodiment, the first node supports multi-beam transmission.

In an embodiment, the first node includes a plurality of radio frequency links.

In an embodiment, a beam capability that can be supported by the first node includes: supporting only single-beam transmission and/or supporting multi-beam transmission.

In an embodiment, the first node includes a first module and a second module.

In an embodiment, the first module includes a first receiver, and the second module includes a second receiver.

In an embodiment, the first module includes a first receiver, and the second module includes a first transmitter.

In an embodiment, the first module is an NCR-MT, and the second module is an NCR-Fwd.

As shown in FIG. 8, the method 800 shown in FIG. 8 may include Step S810. Step S810: Receiving first information.

In an embodiment, the first information is received by the first module.

In an embodiment, the first information includes a plurality of pieces of beam information and a plurality of time resource sets. Alternatively, the first information is used to indicate a plurality of pieces of beam information and a plurality of time resource sets.

In an embodiment, the plurality of time resource sets are associated with the plurality of pieces of beam information respectively.

In an embodiment, the first information is used to indicate a combination of a plurality of pieces of beam information and a plurality of time resource sets.

In an embodiment, the first information is used to indicate one or more beam indication combinations, and each of the one or more beam indication combinations includes one piece of beam information and one time resource set.

In an embodiment, the plurality of pieces of beam information are respectively a plurality of beam indexes.

In an embodiment, the plurality of pieces of beam information is equivalent to a plurality of beam indexes.

In an embodiment, the plurality of pieces of beam information are respectively a plurality of spatial domain filter indexes.

In an embodiment, the plurality of pieces of beam information respectively indicate a plurality of spatial domain filters.

In an embodiment, the plurality of pieces of beam information are respectively a plurality of spatial filters.

In an embodiment, the plurality of pieces of beam information respectively indicate a plurality of spatial filters.

In an embodiment, the plurality of pieces of beam information are respectively a plurality of spatial domain transmission filters.

In an embodiment, the plurality of pieces of beam information respectively indicate a plurality of spatial domain transmission filters.

In an embodiment, the plurality of pieces of beam information are respectively a plurality of antenna ports.

In an embodiment, the plurality of pieces of beam information respectively indicate a plurality of antenna ports.

In an embodiment, at least two of the plurality of time resource sets included in the first information include a first time resource, and at least two pieces of beam information respectively associated with the at least two time resource sets are different. Alternatively, the first time resource corresponds to at least two pieces of beam information, and the at least two pieces of beam information associated with the first time resource are different.

In an embodiment, the first time resource includes one or more multicarrier symbols.

In an embodiment, the one or more multicarrier symbols included in the first time resource are located in a same slot.

In an embodiment, the one or more multicarrier symbols included in the first time resource are located in different slots.

In an embodiment, the first time resource includes one or more slots.

In an embodiment, at least one of the at least two pieces of beam information is used to determine that the second module is in a first state on the first time resource.

In an embodiment, the first state is one of a plurality of candidate states.

In an embodiment, the plurality of candidate states include at least two of a stopping state, sending a radio signal by using one or more first-type beams, and receiving a radio signal by using one or more first-type beams.

In an embodiment, the plurality of candidate states include at least two of a stopping state, a sending state, and a receiving state, the sending state is used to send a radio signal by using one or more first-type beams, and the receiving state is used to receive a radio signal by using one or more first-type beams.

In an embodiment, the plurality of candidate states include at least two of a stopping state, a state of sending a radio signal by using one or more first-type beams, and a state of receiving a radio signal by using one or more first-type beams.

In an embodiment, the radio signal is transmitted on an A-link.

In an embodiment, the radio signal is transmitted on a B-link.

In an embodiment, the radio signal includes: a downlink radio frequency signal sent by a base station to a user equipment, and/or an uplink radio frequency signal sent by a user equipment to a base station.

In an embodiment, the stopping state includes the second module giving up sending a radio signal.

In an embodiment, the stopping state includes the second module giving up receiving a radio signal.

In an embodiment, the stopping state includes the second module giving up sending a radio signal and the second module giving up receiving a radio signal.

In an embodiment, the first state of the second module on the first time resource is determined by the first module.

In an embodiment, giving up sending or giving up receiving the radio signal on the first time resource is determined by the first module.

In an embodiment, giving up sending or giving up receiving the radio signal on the first time resource is performed by the second module.

In an embodiment, sending or receiving the radio signal on the first time resource by using one or more first-type beams is determined by the first module.

In an embodiment, sending or receiving the radio signal on the first time resource by using one or more first-type beams is performed by the second module in the first node.

In an embodiment, the first information includes DCI.

In an embodiment, the first information is carried in DCI.

In an embodiment, the first information includes a DCI format 5_0.

In an embodiment, the first information is carried in DCI, and a format of the DCI is a DCI format 5_0.

In an embodiment, the first information is carried in DCI, and a format of the DCI is a DCI format other than a DCI format 5_0, which is not limited in this embodiment of the present application.

In an embodiment, the first information includes RRC signaling.

In an embodiment, the first information is carried in RRC signaling.

In an embodiment, the first information includes one piece of RRC signaling. Alternatively, the first information is carried in one piece of RRC signaling.

In an embodiment, the first information includes one radio resource control-information element (RRC-IE).

In an embodiment, the first information includes a media access control-control element (MAC-CE). Alternatively, the first information is carried in a MAC-CE.

In an embodiment, the first information includes one MAC-CE.

In an embodiment, the first information is one piece of SCI.

In an embodiment, the first information belongs to one piece of SCI.

In an embodiment, the first information is carried in SCI.

In an embodiment, the first information is transmitted on a C-link.

In an embodiment, the plurality of pieces of beam information included in the first information are carried in a same piece of signaling.

In an embodiment, the plurality of pieces of beam information included in the first information are carried in different pieces of signaling.

In an embodiment, the first information is carried in a same piece of signaling.

In an embodiment, the first information is carried in different pieces of signaling.

As shown in FIG. 8 again, in some embodiments, the method 800 shown in FIG. 8 may further include Step S805. Step S805: Receiving second information.

In an embodiment, Step S805 is performed before Step S810.

In an embodiment, Step S805 and Step S810 are simultaneously performed.

In an embodiment, the second information is used to indicate one or more time resource lists, and each of the one or more time resource lists includes a plurality of time resource sets.

In an embodiment, each of the plurality of time resource sets included in the first information is one of the plurality of time resource sets included in one of the one or more time resource lists indicated by the second information.

In an embodiment, the plurality of time resource sets included in the first information all belong to one of the one or more time resource lists indicated by the second information.

In an embodiment, the plurality of time resource sets included in the first information belong to different time resource lists in the one or more time resource lists indicated by the second information.

In an embodiment, the plurality of time resource sets included in the first information belong to a plurality of time resource lists in the one or more time resource lists indicated by the second information.

In an embodiment, the second information is used to indicate one or more beam information lists, and each of the one or more beam information lists includes a plurality of pieces of beam information.

In an embodiment, each of the plurality of pieces of beam information included in the first information is one of the plurality of pieces of beam information included in one of the one or more beam information lists indicated by the second information.

In an embodiment, the plurality of pieces of beam information included in the first information all belong to one of the one or more beam information lists indicated by the second information.

In an embodiment, the plurality of pieces of beam information included in the first information belong to different beam information lists in the one or more beam information lists indicated by the second information.

In an embodiment, the plurality of pieces of beam information included in the first information belong to a plurality of beam information lists in the one or more beam information lists indicated by the second information.

In an embodiment, the second information is used to indicate one or more time resource lists and one or more beam information lists.

In an embodiment, the second information includes one piece of RRC signaling.

In an embodiment, the second information is carried in RRC signaling.

In an embodiment, the second information is carried in a same piece of RRC signaling.

In an embodiment, the second information is carried in different pieces of RRC signaling.

In an embodiment, the second information includes one RRC-IE.

In an embodiment, the second information includes one MAC-CE.

In an embodiment, the second information is carried in a MAC-CE.

In an embodiment, the second information is one piece of SCI.

In an embodiment, the second information belongs to SCI.

In an embodiment, both the first information and the second information are SCI.

In an embodiment, the first information includes DCI, and the second information includes RRC signaling.

In an embodiment, the first information is carried in DCI, and the second information is carried in RRC signaling.

In an embodiment, the first information includes a MAC-CE, and the second information includes RRC signaling.

In an embodiment, the first information is carried in a MAC-CE, and the second information is carried in RRC signaling.

In an embodiment, both the first information and the second information are transmitted on a C-link.

In an embodiment, both the first information and the second information are received by the first module.

In an embodiment, the second information is received before the first information is received.

In an embodiment, the second information and the first information are simultaneously received.

As described above, at least one of the at least two pieces of beam information is used to determine that the second module is in a first state on the first time resource. How to determine the first state is described below.

In an embodiment, the first state is the stopping state.

In an embodiment, the stopping state is indicated by using one piece of beam information and one time resource set.

In an embodiment, the stopping state is indicated by using a beam indication combination, and the beam indication combination includes one piece of beam information and one time resource set.

In an embodiment, the stopping state is used to indicate the second module to give up, on one time resource set associated with the stopping state, sending the radio signal.

In an embodiment, the stopping state is used to indicate the second module to give up, on one time resource set associated with the stopping state, receiving the radio signal.

In an embodiment, the stopping state is used to indicate the second module to give up, on one time resource set associated with the stopping state, sending, and receiving the radio signal.

In an embodiment, beam information used to indicate the stopping state is a beam 0.

In an embodiment, the stopping state is indicated by using one beam index, that is, a beam 0, and one time resource set.

In an embodiment, one of the at least two pieces of beam information is first beam information.

In an embodiment, the first beam information is used to determine that the first state is the stopping state.

In an embodiment, the first beam information is used to determine that the second module gives up, on the first time resource, sending and receiving the radio signal.

In an embodiment, the first beam information is used to determine that the second module gives up, on the first time resource, sending the radio signal.

In an embodiment, the first beam information is used to determine that the second module gives up, on the first time resource, receiving the radio signal.

In an embodiment, the stopping state is used to indicate the second module to give up, on the first time resource, sending and/or receiving the radio signal.

In an embodiment, at least one of the at least two pieces of beam information is used to determine the one or more first-type beams.

In an embodiment, one of the at least two pieces of beam information is second beam information, and the second beam information is used to determine the one or more first-type beams.

In an embodiment, the second beam information is used to determine one first-type beam.

In an embodiment, the first node supports only single-beam transmission, and the second beam information is used to determine one first-type beam.

In an embodiment, the second beam information is randomly determined from the at least two pieces of beam information by the first node.

In an embodiment, respective positions of the at least two pieces of beam information in the plurality of pieces of beam information included in the first information are used to determine the second beam information.

In an embodiment, respective positions of the at least two pieces of beam information in the first information are used to determine the second beam information.

In an embodiment, the second beam information is one of the at least two pieces of beam information in the first information, before any other piece of beam information of the at least two pieces of beam information.

In an embodiment, the at least two pieces of beam information include second beam information and third beam information, and a position of the second beam information in the first information precedes a position of the third beam information in the first information. The second beam information is used to determine the one or more first-type beams.

In an embodiment, the second beam information is one pieces of beam information, in the at least two pieces of beam information in the plurality of pieces of beam information included in the first information, before any other piece of beam information of the at least two pieces of beam information.

In an embodiment, the at least two pieces of beam information include second beam information and third beam information, and a position of the second beam information in the plurality of pieces of beam information included in the first information precedes a position of the third beam information in the plurality of pieces of beam information included in the first information. The second beam information is used to determine the one or more first-type beams.

In an embodiment, the second beam information is one piece of beam information, of the at least two pieces of beam information in the first information, after any other piece of beam information of the at least two pieces of beam information.

In an embodiment, the at least two pieces of beam information include second beam information and third beam information, and a position of the second beam information in the first information is after a position of the third beam information in the first information. The second beam information is used to determine the one or more first-type beams.

In an embodiment, the second beam information is one piece of beam information, of the at least two pieces of beam information in the plurality of pieces of beam information included in the first information, after any other piece of beam information of the at least two pieces of beam information.

In an embodiment, the at least two pieces of beam information include second beam information and third beam information, and a position of the second beam information in the plurality of pieces of beam information included in the first information is after a position of the third beam information in the plurality of pieces of beam information included in the first information. The second beam information is used to determine the one or more first-type beams.

In an embodiment, a piece of beam information, of the plurality of pieces of beam information included in the first information, before any other piece of beam information of the plurality of pieces of beam information is recommended for use by a second node.

In an embodiment, a piece of beam information, of the plurality of pieces of beam information included in the first information, after any other piece of beam information of the plurality of pieces of beam information is recommended for use by a second node.

In an embodiment, the at least two pieces of beam information are used to determine the plurality of first-type beams.

In an embodiment, the at least two pieces of beam information are all used to determine the plurality of first-type beams.

In an embodiment, the first node supports multi-beam transmission, and the at least two pieces of beam information are all used to determine the plurality of first-type beams.

In an embodiment, the second module sends or receives a radio signal on the first time resource by using one first-type beam.

In an embodiment, the second module supports sending or receiving a radio signal on the first time resource by using a plurality of first-type beams, and the at least two pieces of beam information are all used to determine the plurality of first-type beams.

It should be noted that, the beams mentioned in this embodiment of the present application may include or be replaced by at least one of the following: a beam, a physical beam, a logical beam, a spatial filter, a spatial domain filter, a spatial domain transmission filter, a spatial domain reception filter, and an antenna port.

It should be noted that the multicarrier symbol mentioned in this embodiment of the present application may include or may be replaced with at least one of the following: a multicarrier symbol, an orthogonal frequency division multiplexing (OFDM) symbol, a discrete Fourier transformation-spread-orthogonal frequency division multiplexing (DFT-s-OFDM) symbol, and a single-carrier frequency division multiple access (single-carrier frequency division multiple access, SC-FDMA) symbol.

For ease of understanding, with reference to specific examples, the following describes how to determine the first state of the second module on the first time resource, so that operations of the first node on the first time resource are not confused. In the example below, an NCR corresponds to the first node mentioned above, a beam indication combination corresponds to the first information mentioned above, a beam index corresponds to the beam information mentioned above, and a gNB corresponds to the second node mentioned above. It should be noted that an example below is merely intended to assist a person skilled in the art in understanding the embodiments of the present application, but not intended to use specific values or specific scenarios in the example to limit the embodiments of the present application. Apparently, a person skilled in the art may make various equivalent modifications or variations based on the provided specific example, and such modifications or variations also fall within the scope of the embodiments of the present application.

It should be noted that in the following example, a solid line represents an operation that needs to be performed by the second module on the first time resource, and a dashed line represents an operation that does not need to be performed by the second module on the first time resource.

Example 1: At least one of the at least two pieces of beam information is the first beam information.

When at least two beam indication combinations from a same piece of signaling or different pieces of signaling conflict with each other on the first time resource, if one beam index includes a beam 0 (that is, used to indicate that the second module is in the stopping state), the NCR determines that the second module is in the stopping state on the first time resource (that is, performs an off operation on the first time resource), to avoid unnecessary interference.

Figure 9:
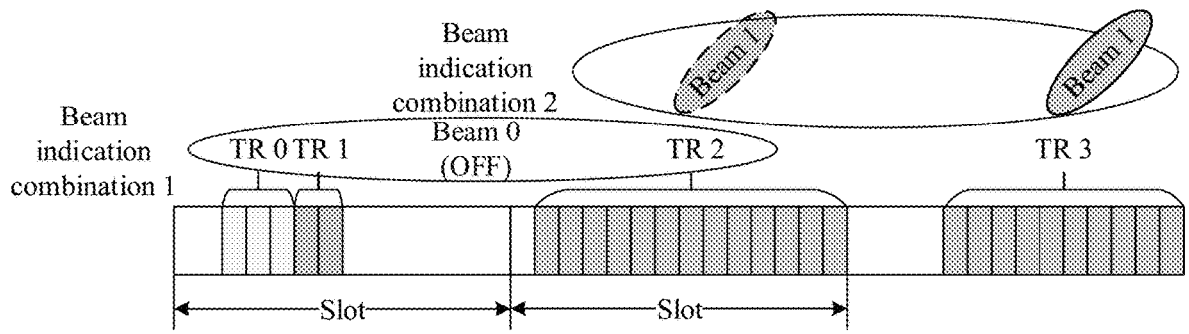
FIG. 9 is an example diagram of a possible beam indication manner according to an embodiment of the present application.

As shown in FIG. 9, a beam indication combination 1 conflicts with a beam indication combination 2 on a TR 2. A beam index associated with the beam indication combination 1 is the beam 0. Therefore, the NCR may determine that the second module is in the stopping state on the TR 2.

In an example in FIG. 9, the beam 0 is represented by a solid line, to indicate that the second module is in the stopping state on the first time resource; and a beam 1 is represented by a dashed line, to indicate that the second module performs transmission on the first time resource without using the beam 1.

Example 2: The second beam information is used to determine the first-type beam, and the second beam information is randomly selected.

In the example 2, the NCR supports only single-beam transmission.

When at least two beam indication combinations from a same piece of signaling or different pieces of signaling conflict with each other on the first time resource, if the two beam indication combinations respectively indicate different beam indexes on the first time resource, the NCR randomly selects one beam index from the indicated beam indexes on the first time resource, and performs transmission based on a beam associated with the selected beam index.

Figure 10:
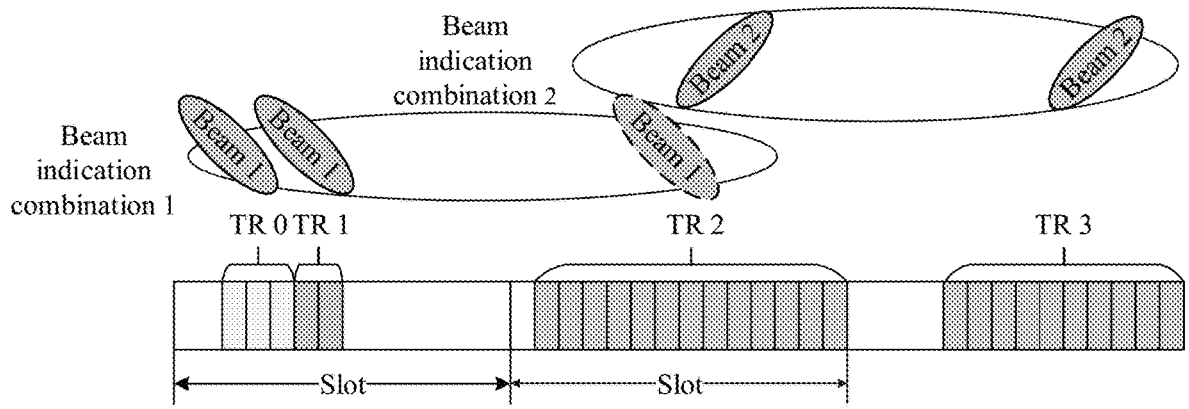
FIG. 10 is an example diagram of a possible beam indication manner according to another embodiment of the present application.

As shown in FIG. 10, a beam indication combination 1 conflicts with a beam indication combination 2 on a TR 2. The beam indication combination 1 indicates, on the TR 2, that transmission is performed by using a beam 1. The beam indication combination 2 indicates, on the TR 2, that transmission is performed by using a beam 2. The NCR randomly selects the beam 2 as a first-type beam, and performs transmission on the TR 2 based on a beam associated with the beam 2.

In an example in FIG. 10, the beam 2 is represented by a solid line, to indicate that the second module performs transmission on the first time resource by using the beam 2; and the beam 1 is represented by a dashed line, to indicate that the second module performs transmission on the first time resource without using the beam 1.

Example 3: The second beam information is used to determine the first-type beam, and the second beam information is selected based on a position of the beam information.

In the example 3, the NCR supports only single-beam transmission.

When at least two beam indication combinations from a same piece of signaling or different pieces of signaling conflict with each other on the first time resource, if the two beam indication combinations respectively indicate different beam indexes on the first time resource, the NCR determines, on the first time resource, one beam index based on positions of beam indexes that correspond to the at least two beam indication combinations and that are in a plurality of domains of the first information, and performs transmission based on a beam associated with the selected beam index. For example, on the first time resource, the NCR may select, from the at least two indicated beam indication combinations as a first-type beam, a beam index before any other piece of beam information of the plurality of domains of the first information.

Figure 11:
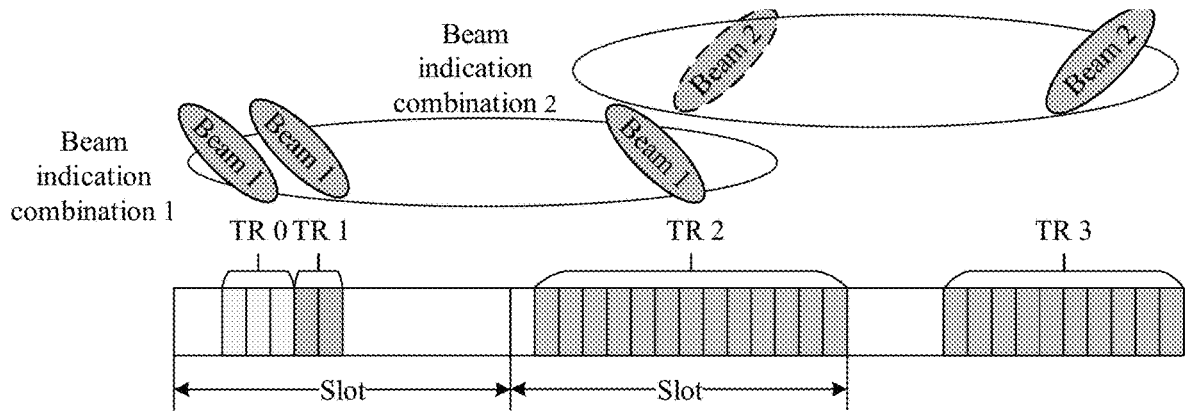
FIG. 11 is an example diagram of a possible beam indication manner according to still another embodiment of the present application.
Figure 12:
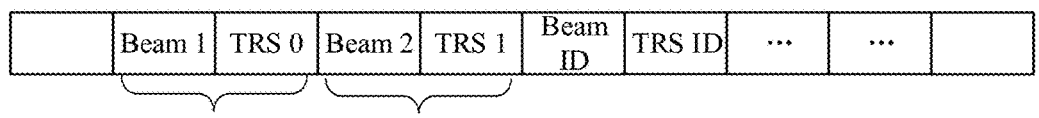
FIG. 12 is an example diagram of a position of beam information in first information according to an embodiment of the present application.

As shown in FIG. 11, a beam indication combination 1 conflicts with a beam indication combination 2 on a TR 2. The beam indication combination 1 indicates, on the TR 2, that transmission is performed by using a beam 1. The beam indication combination 2 indicates, on the TR 2, that transmission is performed by using a beam 2. The NCR selects, from the indicated beam indication combination 1 and the indicated beam indication combination 2 as a first-type beam, a beam index (the beam 1) before any other beam index of the plurality of domains of the first information, and transmission is performed on the TR 2 based on a beam associated with the beam 1. For positions that are of the beam indication combination 1 and the beam indication combination 2 and that are in the plurality of domains of the first information, reference may be made to FIG. 12. In an embodiment, a gNB may arrange a preferred (recommended) beam indication combination before any other beam indication combination of the plurality of domains of the first information.

In the example in FIG. 11, the beam 1 is represented by a solid line, to indicate that the second module performs transmission on the first time resource by using the beam 1; and the beam 2 is represented by a dashed line, to indicate that the second module performs transmission on the first time resource without using the beam 2.

Example 4: At least two pieces of beam information are all used to determine a first-type beam.

In the example 4, the NCR includes a plurality of radio frequency links, and may support multi-beam transmission.

When at least two beam indication combinations from a same piece of signaling or different pieces of signaling conflict with each other on the first time resource, if the two beam indication combinations respectively indicate different beam indexes on the first time resource, the NCR may obtain, on the first time resource, a union of the plurality of beam indexes indicated by the at least two beam indication combinations, and perform multi-beam transmission based on beams associated with all selected beam indexes, for example, on an A-link, perform multi-beam transmission based on the beams associated with all the selected beam indexes.

Figure 13:
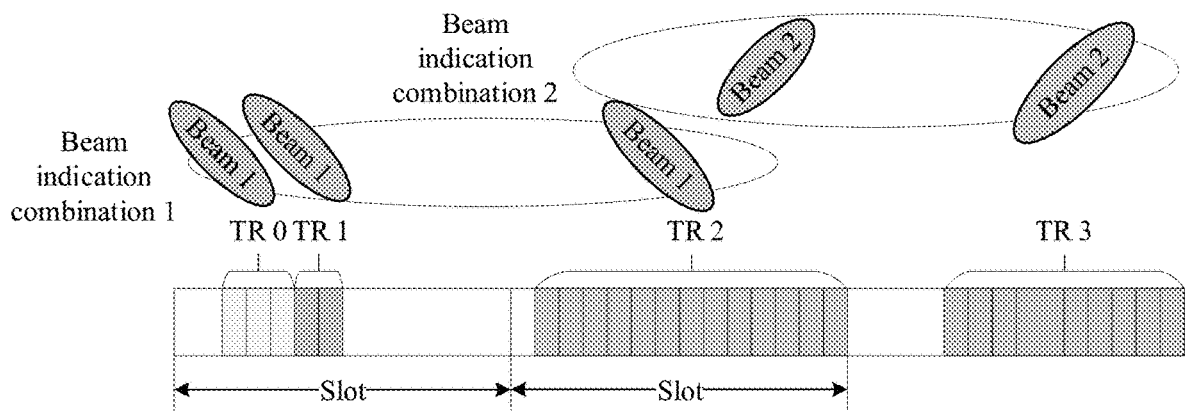
FIG. 13 is an example diagram of a possible beam indication manner according to yet another embodiment of the present application.

As shown in FIG. 13, a beam indication combination 1 conflicts with a beam indication combination 2 on a TR 2. The beam indication combination 1 indicates, on the TR 2, that transmission is performed by using a beam 1. The beam indication combination 2 indicates, on the TR 2, that transmission is performed by using a beam 2. The NCR selects a beam associated with the beam 1 and a beam associated with the beam 2 to perform multi-beam transmission on the TR 2.

In the example in FIG. 13, each of the beam 1 and the beam 2 is represented by a solid line, to indicate that the second module performs multi-beam transmission on the first time resource by using the beam 1 and the beam 2.

The method for a first node used for wireless communication according to the embodiment of the present application is described above from the perspective of the first node with reference to FIG. 8 to FIG. 13. A method for a second node used for wireless communication according to an embodiment of the present application is described below from a perspective of a second node with reference to FIG. 14. It should be understood that descriptions of the first node and the second node correspond to each other, and therefore, for a part that is not described in detail, reference may be made to the foregoing descriptions.

In an embodiment, the second node may be a node that is in a communications system and that has a capability to send or broadcast first information.

In an embodiment, the second node may be a base station.

In an embodiment, the second node includes a first transmitter.

Figure 14:
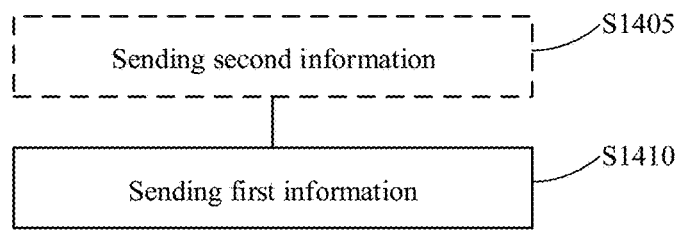
FIG. 14 is a schematic flowchart of a method for a second node used for wireless communication according to an embodiment of the present application.

FIG. 14 is a schematic flowchart of a method for a second node used for wireless communication according to an embodiment of the present application. The method 1400 shown in FIG. 14 may include Step S1410.

Step S1410: Sending first information. The first information includes a plurality of pieces of beam information and a plurality of time resource sets, and the plurality of time resource sets are associated with the plurality of pieces of beam information respectively.

At least two of the plurality of time resource sets include a first time resource, and at least two pieces of beam information respectively associated with the at least two time resource sets are different. At least one of the at least two pieces of beam information is used to determine that a second module of a first node is in a first state on the first time resource, the first state is one of a plurality of candidate states, and the plurality of candidate states include at least two of a stopping state, applying one or more first-type beams for transmissions of a radio signal, and applying one or more first-type beams for receptions of a radio signal.

In an embodiment, the first information is sent by the second node by using a first transmitter.

In an embodiment, the first time resource includes one or more multicarrier symbols.

In an embodiment, the first information includes DCI, or the first information includes a DCI format 5_0.

In an embodiment, the method 1400 further includes Step S1405. Step S1405: Sending second information, where the second information is used to indicate one or more time resource lists, and each of the one or more time resource lists includes a plurality of time resource sets; and each of the plurality of time resource sets included in the first information is one of the plurality of time resource sets included in one of the one or more time resource lists indicated by the second information.

In an embodiment, Step S1405 is performed before Step S1410.

In an embodiment, Step S1405 and Step S1410 are simultaneously performed.

In an embodiment, one of the at least two pieces of beam information is first beam information, and the first state is the stopping state.

In an embodiment, at least one of the at least two pieces of beam information is used to determine the one or more first-type beams.

In an embodiment, respective positions of the at least two pieces of beam information in the plurality of pieces of beam information included in the first information are used to determine second beam information, and the second beam information is used to determine the one or more first-type beams.

In an embodiment, the at least two pieces of beam information include second beam information and third beam information, and a position of the second beam information in the first information precedes a position of the third beam information in the first information.

In an embodiment, the at least two pieces of beam information are all used to determine the plurality of first-type beams.

In an embodiment, the plurality of pieces of beam information included in the first information are carried in a same piece of signaling, or the plurality of pieces of beam information included in the first information are carried in different pieces of signaling.

The method embodiments of the present application are described above in detail with reference to FIG. 1 to FIG. 14. An apparatus embodiments of the present application are described below in detail with reference to FIG. 15 to FIG. 18. It should be understood that the descriptions of the method embodiments correspond to the descriptions of the apparatus embodiments, and therefore, for parts that are not described in detail, reference may be made to the foregoing method embodiments.

Figure 15:
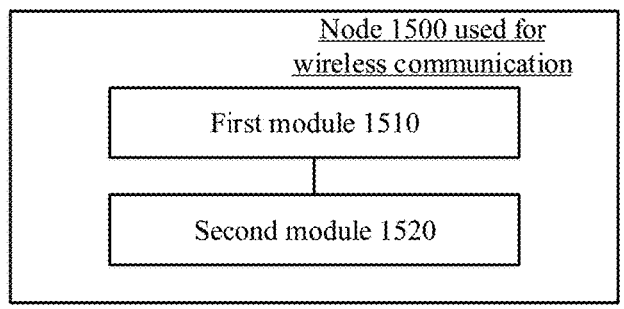
FIG. 15 is a schematic structural diagram of a node used for wireless communication according to an embodiment of the present application.

FIG. 15 is a schematic structural diagram of a node used for wireless communication according to an embodiment of the present application. The node 1500 may be any first node mentioned above. The first node may include a first module 1510 and a second module 1520.

The first module 1510 may be configured to receive first information, where the first information includes a plurality of pieces of beam information and a plurality of time resource sets, and the plurality of time resource sets are associated with the plurality of pieces of beam information respectively. At least two of the plurality of time resource sets include a first time resource, and at least two pieces of beam information respectively associated with the at least two time resource sets are different. At least one of the at least two pieces of beam information is used to determine that the second module 1520 is in a first state on the first time resource, the first state is one of a plurality of candidate states, and the plurality of candidate states include at least two of a stopping state, applying one or more first-type beams for transmissions of a radio signal, and applying one or more first-type beams for receptions of a radio signal.

In an embodiment, the first time resource includes one or more multicarrier symbols.

In an embodiment, the first information includes DCI, or the first information includes a DCI format 5_0.

In an embodiment, the first module 1510 may be further configured to receive second information, where the second information is used to indicate one or more time resource lists, and each of the one or more time resource lists includes a plurality of time resource sets; and each of the plurality of time resource sets included in the first information is one of the plurality of time resource sets included in one of the one or more time resource lists indicated by the second information.

In an embodiment, one of the at least two pieces of beam information is first beam information, and the first state is the stopping state.

In an embodiment, at least one of the at least two pieces of beam information is used to determine the one or more first-type beams.

In an embodiment, respective positions of the at least two pieces of beam information in the plurality of pieces of beam information included in the first information are used to determine second beam information, and the second beam information is used to determine the one or more first-type beams.

In an embodiment, the at least two pieces of beam information include second beam information and third beam information, and a position of the second beam information in the first information precedes a position of the third beam information in the first information.

In an embodiment, the at least two pieces of beam information are all used to determine the plurality of first-type beams.

In an embodiment, the plurality of pieces of beam information included in the first information are carried in a same piece of signaling, or the plurality of pieces of beam information included in the first information are carried in different pieces of signaling.

Figure 17:
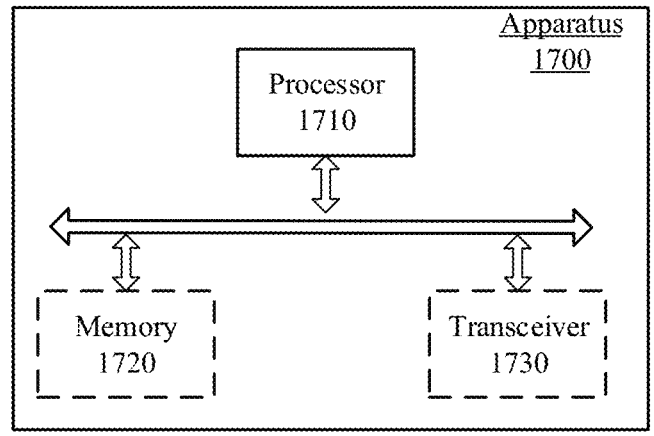
FIG. 17 is a schematic structural diagram of an apparatus according to an embodiment of the present application.

In an embodiment, the first module 1510 and the second module 1520 may be transceivers 1730. The first node 1500 may further include a processor 1710 and a memory 1720. Details are shown in FIG. 17.

Figure 16:
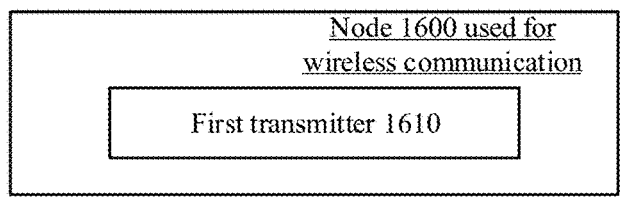
FIG. 16 is a schematic structural diagram of a node used for wireless communication according to another embodiment of the present application.

FIG. 16 is a schematic structural diagram of a node used for wireless communication according to another embodiment of the present application. The node 1600 may be any second node mentioned above. The second node may include a first transmitter 1610.

The first transmitter 1610 may be configured to send first information, where the first information includes a plurality of pieces of beam information and a plurality of time resource sets, and the plurality of time resource sets are associated with the plurality of pieces of beam information respectively. At least two of the plurality of time resource sets include a first time resource, and at least two pieces of beam information respectively associated with the at least two time resource sets are different. At least one of the at least two pieces of beam information is used to determine that a second module of a first node is in a first state on the first time resource, the first state is one of a plurality of candidate states, and the plurality of candidate states include at least two of a stopping state, applying one or more first-type beams for transmissions of a radio signal, and applying one or more first-type beams for receptions of a radio signal.

In an embodiment, the first time resource includes one or more multicarrier symbols.

In an embodiment, the first information includes DCI, or the first information includes a DCI format 5_0.

In an embodiment, the first transmitter 1610 may be further configured to send second information, where the second information is used to indicate one or more time resource lists, and each of the one or more time resource lists includes a plurality of time resource sets; and each of the plurality of time resource sets included in the first information is one of the plurality of time resource sets included in one of the one or more time resource lists indicated by the second information.

In an embodiment, one of the at least two pieces of beam information is first beam information, and the first state is the stopping state.

In an embodiment, at least one of the at least two pieces of beam information is used to determine the one or more first-type beams.

In an embodiment, respective positions of the at least two pieces of beam information in the plurality of pieces of beam information included in the first information are used to determine second beam information, and the second beam information is used to determine the one or more first-type beams.

In an embodiment, the at least two pieces of beam information include second beam information and third beam information, and a position of the second beam information in the first information precedes a position of the third beam information in the first information.

In an embodiment, the at least two pieces of beam information are all used to determine the plurality of first-type beams.

In an embodiment, the plurality of pieces of beam information included in the first information are carried in a same piece of signaling, or the plurality of pieces of beam information included in the first information are carried in different pieces of signaling.

In an embodiment, the first transmitter 1610 may be a transceiver 1730. The second node 1600 may further include a processor 1710 and a memory 1720. Details are shown in FIG. 17.

FIG. 17 is a schematic structural diagram of a communications apparatus according to an embodiment of the present application. Dashed lines in FIG. 17 indicate that the unit or module is optional. The apparatus 1700 may be configured to implement the methods described in the foregoing method embodiments. The apparatus 1700 may be a chip, a user equipment, or a network device.

The apparatus 1700 may include one or more processors 1710. The processor 1710 may allow the apparatus 1700 to implement the methods described in the foregoing method embodiments. The processor 1710 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1700 may further include one or more memories 1720. The memory 1720 stores a program that may be executed by the processor 1710, so that the processor 1710 performs the methods described in the foregoing method embodiments. The memory 1720 may be independent of the processor 1710 or may be integrated into the processor 1710.

The apparatus 1700 may further include a transceiver 1730. The processor 1710 may communicate with another device or chip by using the transceiver 1730. For example, the processor 1710 may send and receive data to and from another device or chip by using the transceiver 1730.

Figure 18:
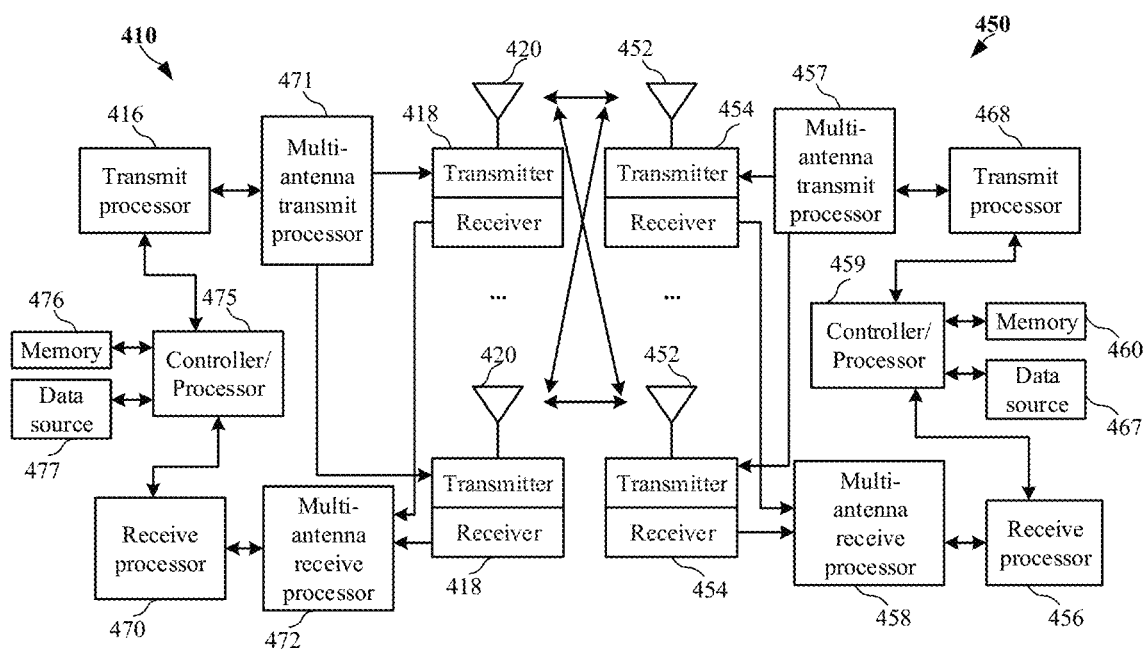
FIG. 18 is a schematic diagram of hardware modules of a communications device according to an embodiment of the present application.

FIG. 18 is a schematic diagram of hardware modules of a communications device according to an embodiment of the present application. Specifically, FIG. 18 is a block diagram of a first communications device 450 and a second communications device 410 communicating with each other in an access network.

The first communications device 450 includes a controller/processor 459, a memory 460, a data source 467, a transmit processor 468, a receive processor 456, a multi-antenna transmit processor 457, a multi-antenna receive processor 458, transmitters/receivers 454, and antennas 452.

The second communications device 410 includes a controller/processor 475, a memory 476, a data source 477, a receive processor 470, a transmit processor 416, a multi-antenna receive processor 472, a multi-antenna transmit processor 471, transmitters/receivers 418, and antennas 420.

During transmission from the second communications device 410 to the first communications device 450, at the second communications device 410, an upper layer data packet from a core network or an upper layer data packet from the data source 477 is provided to the controller/processor 475. The core network and the data source 477 represent all protocol layers above an L2 layer. The controller/processor 475 implements a function of the L2 layer. During transmission from the second communications device 410 to the first communications device 450, the controller/processor 475 provides header compression, encryption, packet segmentation and reordering, multiplexing between a logical channel and a transport channel, and allocation of radio resources of the first communications device 450 based on various priority measurements. The controller/processor 475 is further responsible for retransmission of a lost packet, and signaling to the first communications device 450. The transmit processor 416 and the multi-antenna transmit processor 471 implement various signal processing functions of an L1 layer (namely, a physical layer). The transmit processor 416 implements encoding and interleaving to facilitate forward error correction at the second communications device 410, and mapping of signal clusters based on various modulation schemes (such as binary phase shift keying, quadrature phase shift keying, M-phase shift keying, and M-quadrature amplitude modulation). The multi-antenna transmit processor 471 performs digital space precoding, including codebook-based precoding and non-codebook-based precoding, on a coded and modulated symbol, and beamforming processing, to generate one or more spatial streams. The transmit processor 416 then maps each spatial stream to a subcarrier, multiplexes the mapped spatial stream with a reference signal (for example, a pilot) in time and/or frequency domain, and then uses an inverse fast Fourier transform to generate a physical channel that carries a time-domain multi-carrier symbol stream. Subsequently, the multi-antenna transmit processor 471 performs an operation of analog precoding transmitting/beamforming on the time-domain multi-carrier symbol stream. Each transmitter 418 converts a baseband multi-carrier symbol stream provided by the multi-antenna transmit processor 471 into a radio frequency stream, and then provides the radio frequency stream for different antennas 420.

During transmission from the second communications device 410 to the first communications device 450, at the first communications device 450, each receiver 454 receives a signal through a corresponding antenna 452 of the receiver 454. Each receiver 454 recovers information modulated onto a radio frequency carrier, converts a radio frequency stream into a baseband multi-carrier symbol stream, and provides the baseband multi-carrier symbol stream for the receive processor 456. The receive processor 456 and the multi-antenna receive processor 458 implement various signal processing functions of the L1 layer. The multi-antenna receive processor 458 performs an operation of analog precoding receiving/beamforming on the baseband multi-carrier symbol stream from the receiver 454. The receive processor 456 converts, from time to frequency domain via fast Fourier transform, the baseband multi-carrier symbol stream obtained after the operation of analog precoding receiving/beamforming. In frequency domain, a physical-layer data signal and a reference signal are demultiplexed by the receive processor 456. The reference signal is used for channel estimation; and the data signal is recovered after multi-antenna detection performed by the multi-antenna receive processor 458, to obtain any spatial stream that uses the first communications device 450 as a destination. Symbols on each spatial stream are demodulated and recovered in the receive processor 456, and a soft decision is generated. The receive processor 456 then decodes and de-interleaves the soft decision to recover upper layer data and a control signal transmitted by the second communications device 410 on a physical channel. The upper layer data and the control signal are then provided to the controller/processor 459. The controller/processor 459 implements functions of the L2 layer. The controller/processor 459 may be associated with the memory 460 that stores program code and data. The memory 460 may be referred to as a computer-readable medium. During transmission from the second communications device 410 to the first communications device 450, the controller/processor 459 provides demultiplexing between a transport channel and a logical channel, packet reassembly, decryption, header decompression, and control signal processing, to recover an upper layer data packet from the second communications device 410. The upper layer packet is then provided to all protocol layers above the L2 layer, or various control signals may be provided to the L3 layer for processing by the L3 layer.

During transmission from the first communications device 450 to the second communications device 410, at the first communications device 450, an upper layer data packet is provided to the controller/processor 459 by using the data source 467. The data source 467 represents all protocol layers above the L2 layer. Similar to the transmit function, at the second communications device 410, described during the transmission from the second communications device 410 to the first communications device 450, the controller/processor 459 implements header compression, encryption, packet segmentation and reordering, and multiplexing between a logical channel and a transport channel, to implement an L2 layer function for a user plane and a control plane. The controller/processor 459 is further responsible for retransmission of a lost packet, and signaling to the second communications device 410. The transmit processor 468 performs modulation mapping and channel coding processing, and the multi-antenna transmit processor 457 performs digital multi-antenna spatial precoding, including codebook-based precoding and non-codebook-based precoding, and beam forming processing. Then the transmit processor 468 modulates a generated spatial stream into a multi-carrier/single-carrier symbol stream, and the multi-carrier/single-carrier symbol stream is provided to different antennas 452 by using the transmitter 454 after undergoing an analog precoding/beamforming operation in the multi-antenna transmit processor 457. Each transmitter 454 first converts a baseband symbol stream provided by the multi-antenna transmit processor 457 into a radio frequency symbol stream, and then provides the radio frequency symbol stream for the antenna 452.

During transmission from the first communications device 450 to the second communications device 410, a function at the second communications device 410 is similar to the receive function, at the first communications device 450, described during the transmission from the second communications device 410 to the first communications device 450. Each receiver 418 receives a radio frequency signal through a corresponding antenna 420 of the receiver 418, converts the received radio frequency signal into a baseband signal, and provides the baseband signal for the multi-antenna receive processor 472 and the receive processor 470. The receive processor 470 and the multi-antenna receive processor 472 jointly implement functions of the L1 layer. The controller/processor 475 implements functions of the L2 layer. The controller/processor 475 may be associated with a memory 476 that stores program code and data. The memory 476 may be referred to as a computer-readable medium. During transmission from the first communications device 450 to the second communications device 410, the controller/processor 475 provides demultiplexing between a transport channel and a logical channel, packet reassembly, decryption, header decompression, and control signal processing, to recover an upper layer data packet from the first communications device 450. The upper layer data packet from the controller/processor 475 may be provided to a core network or all protocol layers above the L2 layer, or various control signals may be provided to the core network or the L3 layer for processing by the L3 layer.

In an embodiment, the first communications device 450 includes: at least one processor and at least one memory. The at least one memory includes computer program code. The at least one memory and the computer program code are configured for use together with the at least one processor, make the first communications device 450 to perform: receives first information, where the first information includes a plurality of pieces of beam information and a plurality of time resource sets, and the plurality of time resource sets are associated with the plurality of pieces of beam information respectively. At least two of the plurality of time resource sets include a first time resource, and at least two pieces of beam information respectively associated with the at least two time resource sets are different. At least one of the at least two pieces of beam information is used to determine that a second module is in a first state on the first time resource, the first state is one of a plurality of candidate states, and the plurality of candidate states include at least two of a stopping state, applying one or more first-type beams for transmissions of a radio signal, and applying one or more first-type beams for receptions of a radio signal.

In an embodiment, the first communications device 450 includes: a memory for storing a computer-readable instruction program, where the computer-readable instruction program generates an action when being executed by at least one processor, and the action includes: receiving first information, where the first information includes a plurality of pieces of beam information and a plurality of time resource sets, and the plurality of time resource sets are associated with the plurality of pieces of beam information respectively, where at least two of the plurality of time resource sets include a first time resource, and at least two pieces of beam information respectively associated with the at least two time resource sets are different; at least one of the at least two pieces of beam information is used to determine that the second module is in a first state on the first time resource, the first state is one of a plurality of candidate states, and the plurality of candidate states include at least two of a stopping state, applying one or more first-type beams for transmissions of a radio signal, and applying one or more first-type beams for receptions of a radio signal.

In an embodiment, the first communications device 450 corresponds to a first node in the present application.

In an embodiment, the second communications device 410 corresponds to a second node in the present application.

In an embodiment, the first communications device 450 is an NCR.

In an embodiment, the first communications device 450 is a wireless repeater.

In an embodiment, the first communications device 450 is a relay.

In an embodiment, the first communications device 450 is a user equipment, and the user equipment may serve as a relay node.

In an embodiment, the first communications device 450 is a user equipment supporting V2X, and the user equipment may serve as a relay node.

In an embodiment, the first communications device 450 is a user equipment supporting D2D, and the user equipment may serve as a relay node.

In an embodiment, the second communications device 410 is a base station.

In an embodiment, the antenna 452, the receiver 454, the multi-antenna receive processor 458, the receive processor 456, and the controller/processor 459 are configured to receive the first information in the present application.

In an embodiment, the antenna 420, the transmitter 418, the multi-antenna transmit processor 471, the transmit processor 416, and the controller/processor 475 are configured to send the first information in the present application.

In an embodiment, the antenna 452, the transmitter 454, the multi-antenna transmit processor 457, the transmit processor 468, and the controller/processor 459 are configured to send the first information in the present application.

In an embodiment, the antenna 420, the receiver 418, the multi-antenna receive processor 472, the receive processor 470, and the controller/processor 475 are configured to receive the first information in the present application.

An embodiment of the present application further provides a computer-readable storage medium for storing a program. The computer-readable storage medium may be applied to the terminal or the network device provided in the embodiments of the present application, and the program causes a computer to perform the methods to be performed by the terminal or the network device in various embodiments of the present application.

An embodiment of the present application further provides a computer program product. The computer program product includes a program. The computer program product may be applied to the terminal or the network device provided in the embodiments of the present application, and the program causes a computer to perform the methods to be performed by the terminal or the network device in various embodiments of the present application.

An embodiment of the present application further provides a computer program. The computer program may be applied to the terminal or the network device provided in the embodiments of the present application, and the computer program causes a computer to perform the methods to be performed by the terminal or the network device in various embodiments of the present application.

It should be understood that the terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In the embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In the embodiments of the present application, "B corresponding to A" means that B is associated with A, and B may be determined based on A. However, it should be further understood that, determining B based on A does not mean determining B based only on A, but instead B may be determined based on A and/or other information.

In the embodiments of the present application, the term "correspond" may mean that there is a direct or indirect correspondence between the two, or may mean that there is an association relationship between the two, or may mean that there is a relationship such as indicating and being indicated, or configuring and being configured.

In the embodiments of the present application, "predefined" or "pre-configured" may be implemented by pre-storing corresponding code, tables, or other forms that may be used to indicate related information in devices (for example, including a user equipment and a network device), and a specific implementation thereof is not limited in the present application. For example, being pre-defined may refer to being defined in a protocol.

In the embodiments of the present application, the "protocol" may refer to a standard protocol in the communications field, and may include, for example, an LTE protocol, an NR protocol, and a related protocol applied to a future communications system, which is not limited in the present application.

In the embodiments of the present application, the term "and/or" is merely an association relationship that describes associated objects, and represents that there may be three relationships. For example, A and/or B may represent three cases: only A exists, both A and B exist, and only B exists.

In addition, the character "/" herein generally indicates an "or" relationship between the associated objects.

In the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to an actual need to achieve the objectives of the solutions of the embodiments.

In addition, function units in the embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A first node, comprising:
   at least one processor; and
   one or more non-transitory computer-readable storage media coupled to the at least one processor and storing programming instructions for execution by the at least one processor, wherein the programming instructions, when executed, cause the first node to perform operations comprising:
   receiving a first signal comprising first beam information and a first time resource set, wherein the first beam information is associated with the first time resource set;
   after receiving the first signal, receiving a second signal comprising second beam information and a second time resource set, wherein the second beam information is associated with the second time resource set, and wherein the first time resource set and the second time resource set comprise a same first time resource; and
   applying the second beam information to transmit or receive a radio signal on the first time resource, wherein both the first signal and the second signal are downlink control information (DCI).

2. The first node according to claim 1, wherein at least one of the first beam information or the second beam information is used to determine one or more of following:
   a network controlled repeater-forwarding (NCR-Fwd) applying one or more first-type beams for transmissions or receptions on the first time resource;
   the NCR-Fwd applying one first-type beam for transmissions or receptions on the first time resource;
   whether the NCR-Fwd is in a stopping state on the first time resource;
   the one first-type beam; or
   a plurality of first-type beams.

3. The first node according to claim 1, wherein the second beam information is used to determine one or more first-type beams.

4. The first node according to claim 1, wherein the first beam information and the first time resource set are indicated by a beam indication combination.

5. The first node according to claim 1, wherein the first beam information and the second beam information are respectively a plurality of beam indexes.

6. The first node according to claim 1, wherein the first time resource comprises one or more symbols.

7. The first node according to claim 1, wherein the operations further comprise:
   receiving second information, wherein the second information indicates one or more time resource lists, and each of the one or more time resource lists comprises a plurality of time resource sets; and each of the plurality of time resource sets belongs to one of the one or more time resource lists indicated by the second information.

8. A method, comprising:
   receiving a first signal comprising first beam information and a first time resource set, wherein the first beam information is associated with the first time resource set;

after receiving the first signal, receiving a second signal comprising second beam information and a second time resource set, wherein the second beam information is associated with the second time resource set, and wherein the first time resource set and the second time resource set comprise a same first time resource; and applying the second beam information to transmit or receive a radio signal on the first time resource, wherein both the first signal and the second signal are downlink control information (DCI).

9. The method according to claim 8, wherein at least one of the first beam information or the second beam information is used to determine one or more of following:
   a network controlled repeater-forwarding (NCR-Fwd) applying one or more first-type beams for transmissions or receptions on the first time resource;
   the NCR-Fwd applying one first-type beam for transmissions or receptions on the first time resource;
   whether the NCR-Fwd is in a stopping state on the first time resource;
   the one first-type beam; or
   a plurality of first-type beams.

10. The method according to claim 8, wherein the second beam information is used to determine one or more first-type beams.

11. A second node, comprising:
   at least one processor; and
   one or more non-transitory computer-readable storage media coupled to the at least one processor and storing programming instructions for execution by the at least one processor, wherein the programming instructions, when executed, cause the second node to perform operations comprising:
   sending, to a first node, a first signal comprising first beam information and a first time resource set, wherein the first beam information is associated with the first time resource set; and
   after sending the first signal, sending a second signal comprising second beam information and a second time resource set, wherein the second beam information is associated with the second time resource set, and wherein the first time resource set and the second time resource set comprise a same first time resource; wherein both the first signal and the second signal are downlink control information (DCI), and the second signal is applied at the first node.

12. The method according to claim 8, wherein the first beam information and the first time resource set are indicated by a beam indication combination.

13. The method according to claim 8, wherein the first beam information and the second beam information are respectively a plurality of beam indexes.

14. The method according to claim 8, wherein the first time resource comprises one or more symbols.

15. The method according to claim 8, wherein the method further comprises:
   receiving second information, wherein the second information indicates one or more time resource lists, and each of the one or more time resource lists comprises a plurality of time resource sets; and each of the plurality of time resource sets belongs to one of the one or more time resource lists indicated by the second information.

16. The second node according to claim 11, wherein at least one of the first beam information or the second beam information is used to determine one or more of following:
   a network controlled repeater-forwarding (NCR-Fwd) applying one or more first-type beams for transmissions or receptions on the first time resource;
   the NCR-Fwd applying one first-type beam for transmissions or receptions on the first time resource;
   whether the NCR-Fwd is in a stopping state on the first time resource;
   the one first-type beam; or a plurality of first-type beams.

17. The second node according to claim 11, wherein the second beam information is used to determine one or more first-type beams.

18. The second node according to claim 11, wherein the first beam information and the first time resource set are indicated by a beam indication combination.

19. The second node according to claim 11, wherein the first beam information and the second beam information are respectively a plurality of beam indexes.

20. The second node according to claim 11, wherein the first time resource comprises one or more symbols.

* * * * *